United States Patent [19]

Marto

[11] 4,320,616
[45] Mar. 23, 1982

[54] LAWN MOWER SUSPENSION
[75] Inventor: John H. Marto, Oshkosh, Wis.
[73] Assignee: J. I. Case Company, Racine, Wis.
[21] Appl. No.: 217,617
[22] Filed: Dec. 18, 1980
[51] Int. Cl.³ .................... A01D 35/26; A01D 55/29
[52] U.S. Cl. ........................................ 56/15.3; 56/17.2
[58] Field of Search ................... 56/15.3, 11.6, 17.2, 56/17.1, DIG. 22

[56] References Cited
U.S. PATENT DOCUMENTS

| | | | |
|---|---|---|---|
| 2,862,343 | 12/1958 | Wood | 56/DIG. 22 |
| 3,136,106 | 6/1964 | Joslin | 56/DIG. 22 |
| 3,245,209 | 4/1966 | Marek | 56/13.4 |
| 3,550,364 | 12/1970 | Musgrave | 56/11.6 |
| 4,084,395 | 4/1978 | Nannen | 56/17.2 |
| 4,102,114 | 7/1978 | Estes et al. | 56/15.3 |
| 4,231,215 | 11/1980 | Klas | 56/11.6 |

Primary Examiner—Paul J. Hirsch
Attorney, Agent, or Firm—Cullen, Sloman, Cantor, Grauer, Scott & Rutherford

[57] ABSTRACT

A parallel linkage suspension for a tractor mounted lawn mower which maintains blade level and drive belt tension at all operating positions of the mower, including an upper mower transport position. The parallel tow bar linkage includes a pair of spaced parallel lower links pivotally connected at opposed ends to the mower assembly and the tractor adjacent the forward end of the tractor and a pair of parallel spaced upper links pivotally connected at opposed ends to the midportion of the mower and the tractor on pivots spaced above and rearwardly of the pivotal connections of the lower links. An idler sheave assembly is pivotally supported on a U-shaped bracket on the upper links, spaced rearwardly of the pivotal connection of the upper links to the tractor, such that the idler sheave assembly moves vertically with the mower on a smaller arc to maintain tension in the belt. The rearward end of the mower is supported by a pair of wheels which are rotatably supported on wheel support arms secured to a rock shaft. A lift arm is connected to the rock shaft and a lift linkage interconnects the lift arm and the upper and lower links, such that rotation of the wheel support arms about the rock shaft lifts the rearward end of the mower and the linkage simultaneously raises the forward end of the mower to raise the mower in parallel relation while maintaining tension in the drive belt.

10 Claims, 4 Drawing Figures

LAWN MOWER SUSPENSION

FIELD OF THE INVENTION

The present invention relates to a tractor suspension for a belt driven harvester having rotary blades. More specifically, this invention relates to improvements in tractor tow bar suspensions for belt driven mowers, wherein the mower is mounted beneath the tractor, between the tractor wheels.

DESCRIPTION OF THE PRIOR ART

Tractor mounted mowers, such as rider mowers, are now common in the industry. The mower assembly may be suspended beneath the tractor on a tow bar linkage, where the mower assembly is adjusted vertically to adjust the cutting height of the blades.

In a belt driven mower of this type, the endless drive belt is received around the power take off pulley of the tractor and a driven pulley on the mower. Belt tension is maintained by a spring tensioned idler sheave assembly which generally includes two sheaves or pulleys which receive the opposed runs of the drive belt, as shown in U.S. Pat. Nos. 3,380,313 and 3,465,607.

The rotary mower assembly may include a plurality of spaced horizontal blades, which rotate on vertical axes, having overlapping cutting paths to provide a uniform cutting swath. The mower tow bar suspension generally includes a plurality of links pivotally attached to the tractor chassis, such that the mower may be adjusted vertically about the link pivot axes. Examples of tow bar suspensions for tractor mounted mowers of this type include U.S. Pat. Nos. 3,245,209 and 3,503,189. Vertical adjustment of this type of tractor mounted mower may result in variations in the drive belt tension, resulting in slippage, particularly at the upper mower transport position. Further, the blade assembly may be tipped as the mower is raised or lowered, resulting in uneven cutting by the blades. Attempts to solve these problems have generally resulted in relatively complex mower suspensions which may be less reliable and which have not fully solved the problems defined above.

The parallel linkage mower suspension of the present invention is relatively simple and raises and lowers the mower assembly in parallel relation to maintain a uniform cutting path. Further, the idler sheave assembly is supported on the drawbar linkage to maintain uniform tension in the drive belt.

SUMMARY OF THE INVENTION

As described above, the lawn mower suspension of this invention suspends the mower beneath a tractor having an endless flexible drive belt received about pulleys on the tractor and the lawn mower. The mower preferably includes a belt tensioning device including a pair of idler sheaves which receive the opposed runs of the drive belt and maintain tension in the belt. The improved drawbar-type mower assembly suspension of this invention includes two pairs of parallel links, including a pair of spaced parallel lower links pivotally attached at their forward ends to the tractor chassis, adjacent the forward end of the tractor, and a pair of parallel spaced upper links, pivotally attached at their forward ends to the tractor on pivots spaced above and rearwardly of the pivotal connections of the lower links. The rearward ends of the lower links are pivotally attached to the forward end of the mower assembly and the rearward ends of the upper links are pivotally attached to a midportion of the mower.

The idler sheave assembly of this invention is supported on a bracket which is pivotally supported on the upper links, rearwardly of the pivotal connection of the upper links to the tractor. The idler sheave assembly thus moves with the drawbar linkage, as the mower assembly is raised or lowered to maintain tension in the drive belt. The rearward end of the mower assembly is supported by wheels rotatably connected to wheel support arms. The wheel support arms are pivotally connected to the mower, adjacent the mower rearward end, and the assembly includes a lift linkage interconnecting the wheel support arms to the upper and lower links. The lift linkage is adapted to simultaneously raise or lower the parallel drawbar linkage, about the pivotal connections to the tractor, upon rotation of the wheel arms. The wheels simultaneously raise or lower the rearward end of the mower, such that the mower is raised or lowered in parallel relation, while maintaining the tension in the drive belt.

In the preferred embodiment, the lift linkage includes a bellcrank lever which is pivotally connected on spaced pivots to one of the upper links, one of the lower links and a tensioning means. The tensioning means is pivotally connected to the bellcrank lever and operably connected to the wheel support arms, to rotate the bellcrank lever upon rotation of the wheel arms, to raise or lower the rearward end of the mower, and simultaneously raise the forward end of the mower about the bellcrank lever. In the disclosed embodiment, the wheel support arms are connected to a rock shaft which is rotatably supported on the rearward end of the mower. The lift arm is connected to the rock shaft and a tie rod is pivotally connected at its opposed ends to the free end of the lift arm and the bellcrank lever. Thus, rotation of the wheel support arms, to raise or lower the rearward end of the mower, rotates the lift arm and tensions the tie rod to simultaneously raise or lower the forward end of the mower, in parallel relation.

The idler sheave assembly in the disclosed embodiment is supported on a U-shaped yoke having a midportion which supports the idler sheave assembly, and upwardly extending legs, which are pivotally supported on the upper links on pivots spaced rearwardly of the pivotal connections of the upper links to the tractor chassis. The idler sheave assembly thus travels vertically with the upper parallel links, on a smaller arc than the mower. The spring loaded sheave assembly will thus accomodate variation in belt tension, maintaining a constant tension in the drive belt. In the disclosed embodiment, the bellcrank is pivotally connected to one of the lower parallel links by a leveler link, which is pivotally connected at its upper end to the bellcrank lever by a lost motion pivot slot and to the pivotal connection between the lower link and the mower at its lower end. The bellcrank lever is connected to the upper link at a second spaced pivotal connection and to the tie rod at its upper free end. Rotation of the wheel support arm to raise or lower the rearward end of the tractor thus rotates the lift arm about the rock shaft. Movement of the lift arm longitudinally moves the tie rod to the bellcrank, simultaneously raising or lowering the forward end of the mower. As described above, the idler sheave assembly moves with the linkage to maintain tension in the drive belt.

The lawn mower suspension of this invention thus maintains blade level and drive belt tension at all operating positions of the mower, including an upper mower transport position. Other advantages and meritorious features of the lawn mower suspension of this invention will be more fully understood from the following description of the preferred embodiments, the appended claims and the drawings, a brief description of which follows.

DESCRIPTION OF THE PREFERRED EMBODIMENTS

Figure 1:
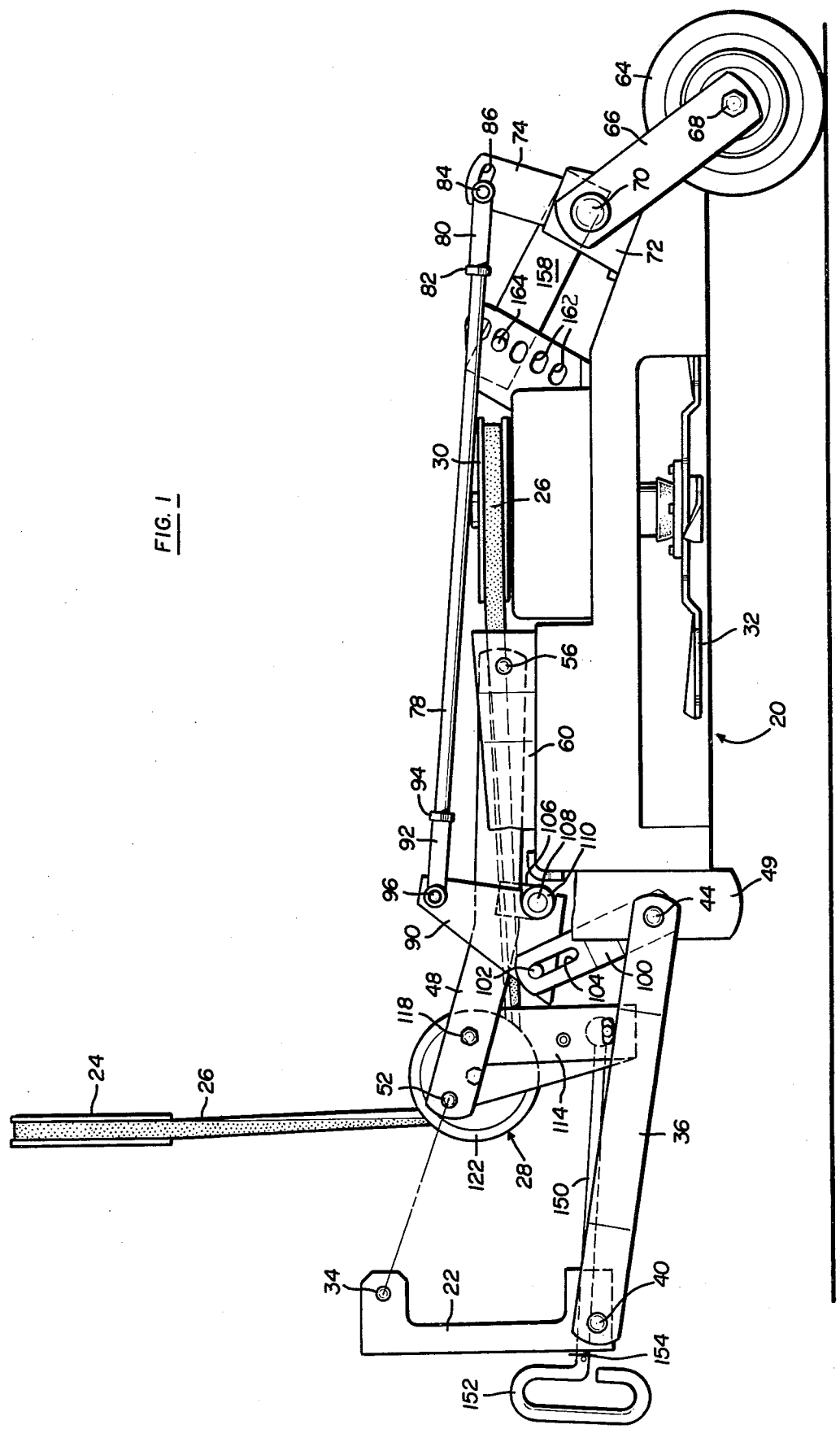
FIG. 1 is a side elevation of one embodiment of the mower suspension of this invention with the mower in a raised position.

The lawn mower suspension of this invention is adapted to mount a mower assembly 20 beneath a tractor. The tractor, not shown, may be a conventional lawn or garden type tractor having a horsepower range from about 5 to 20 HP, such as disclosed in the prior art patents cited hereinabove and incorporated herein by reference. The tractor includes a C-shaped carriage hitch 22 and a power take-off pulley 24 which is mounted on the forward output shaft of the tractor, not shown. An endless drive belt 26 is received on the power take-off pulley 24 of the tractor, around the idler sheaves of the idler sheave assembly 28, and around the mower driven pulley 30, to drive the rotary mower blades 32. The tractor, which does not form a part of this invention, may be any conventional tractor. The details of the mower assembly 20, which do not form a part of this invention, are more fully described in a copending application Ser. No. 217,730, which is incorporated herein by reference.

The mower suspension of this invention utilizes two pair of parallel links, which form a drawbar-type suspension supporting the forward end of the mower assembly 20. The suspension includes a pair of lower parallel links 36 and 38, which are pivotally connected to the carriage hitch 22 at 40 and 42, respectively. The carriage hitch is attached to the forward end of the tractor by bolts or the like through apertures 34 in the carriage hitch. The rearward ends of the lower links 36 and 38 are pivotally connected to the mower frame 49 by pivotal connections 44 and 46, respectively. In the disclosed embodiment, the pivotal connections are provided by metal pins, which are received through apertures in the links and the tractor chassis or mower frame, and which are retained by cotter pins, not shown. The linkage may thus be easily disassembled, as required.

The drawbar linkage also includes a pair of parallel upper links 48 and 50 which are pivotally connected to the tractor chassis at their forward ends by pins received through pivot apertures 52 and 54, respectively. The rearward ends of the upper parallel links are pivotally connected to mower frame members 60 by pivotal connections 56 and 58, respectively. As shown, the upper parallel links 48 and 50 are generally parallel to the lower parallel links 36 and 38, forming two pairs of parallelograms about which the forward end of the mower assembly may be raised about the pivotal connections of the links to the tractor, as described hereinbelow.

Figure 3:
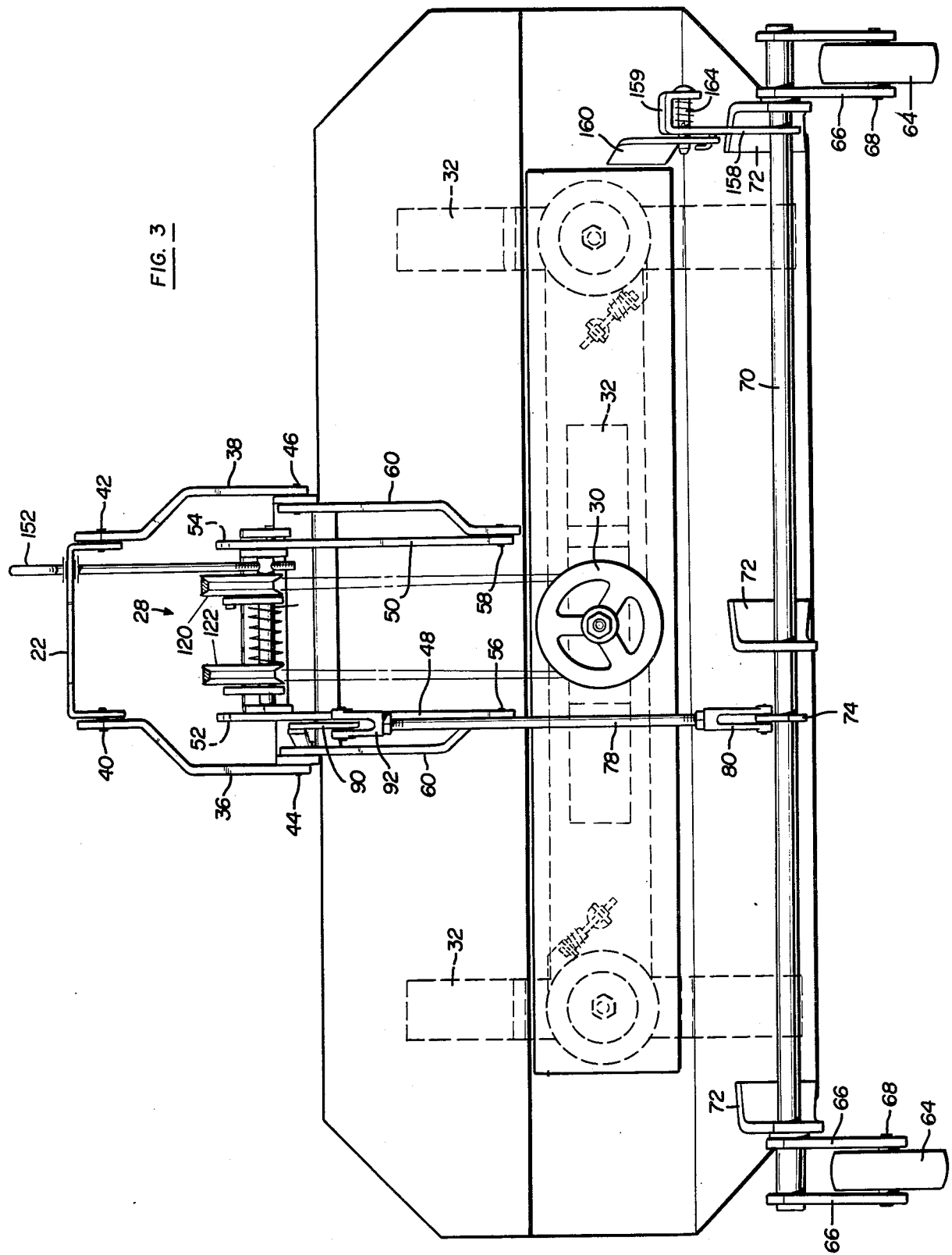
FIG. 3 is a top elevation of the mower and suspension shown in FIGS. 1 and 2.

The rearward end of the mower assembly is supported on gage wheels 64. The gage wheels are rotatably supported on wheel support arms 66 by conventional bolt and bearing assemblies 68. The wheel support arms are connected to rock shaft 70, which is rotatably supported at the rearward end of the mower by brackets 72. The brackets are welded or otherwise secured to the mower frame, as best shown in FIG. 3. A lift arm 74 is connected to the rock shaft to form a bellcrank lever with the rock shaft and wheel support arms, such that rotation of the wheel support arms 66, about rock shaft 70, rotates the lift arm 74.

The lift arm 74 is operably connected to the drawbar linkage by a tie rod 78. The tie rod includes a rear clevis 80 which is threadably received on the rearward end of the tie rod and retained by nut 82. The clevis is pivotally connected to the upper free end of the lift arm 74 by pivot pin 84, which is received in an arcuate slot 86 to accomodate the rotational motion of the lift arm about rock shaft 70. The forward end of the tie rod is pivotally connected to a bellcrank lever 90 by clevis 92, which is threadably received on the forward end of the tie rod and retained by nut 94. The clevis is pivotally connected to the upper free end of the bellcrank by pivot pin 96. As described, above, the pivot pins in the disclosed embodiment are retained by cotter pins, not shown. The bellcrank lever 90 is pivotally connected to one of the upper parallel links 48 and one of the lower parallel links 36 to raise the forward end of the mower in parallel relation to the rearward mower end and maintain the rotary blades level for an even cut.

The bellcrank lever is connected by a leveler link 100 to the pivotal connection 44 between the lower link 36 and the mower frame member 49. The upper end of the leveler link is pivotally connected to the bellcrank lever by pin 102, which is received in a lost motion slot 104 in the leveler link. The lost motion slot will accomodate the arcuate motion of the bellcrank lever. The bellcrank lever is connected to one of the upper links 48 by a rectangular tab 106, which is welded or otherwise secured to the upper link 48. The pivot pin 108 is rotatably received in a bearing sleeve 110, which is secured to or integral with the tab 106. The bellcrank lever 90 is thus pivotally connected to one of the upper and lower parallel links, 48 and 36, respectively, and to the tie rod 78 at its free end. Longitudinal movement of the tie rod 78 will thus rotate the bellcrank lever to adjust the height of the forward end of the mower, as described hereinbelow.

Figure 4:
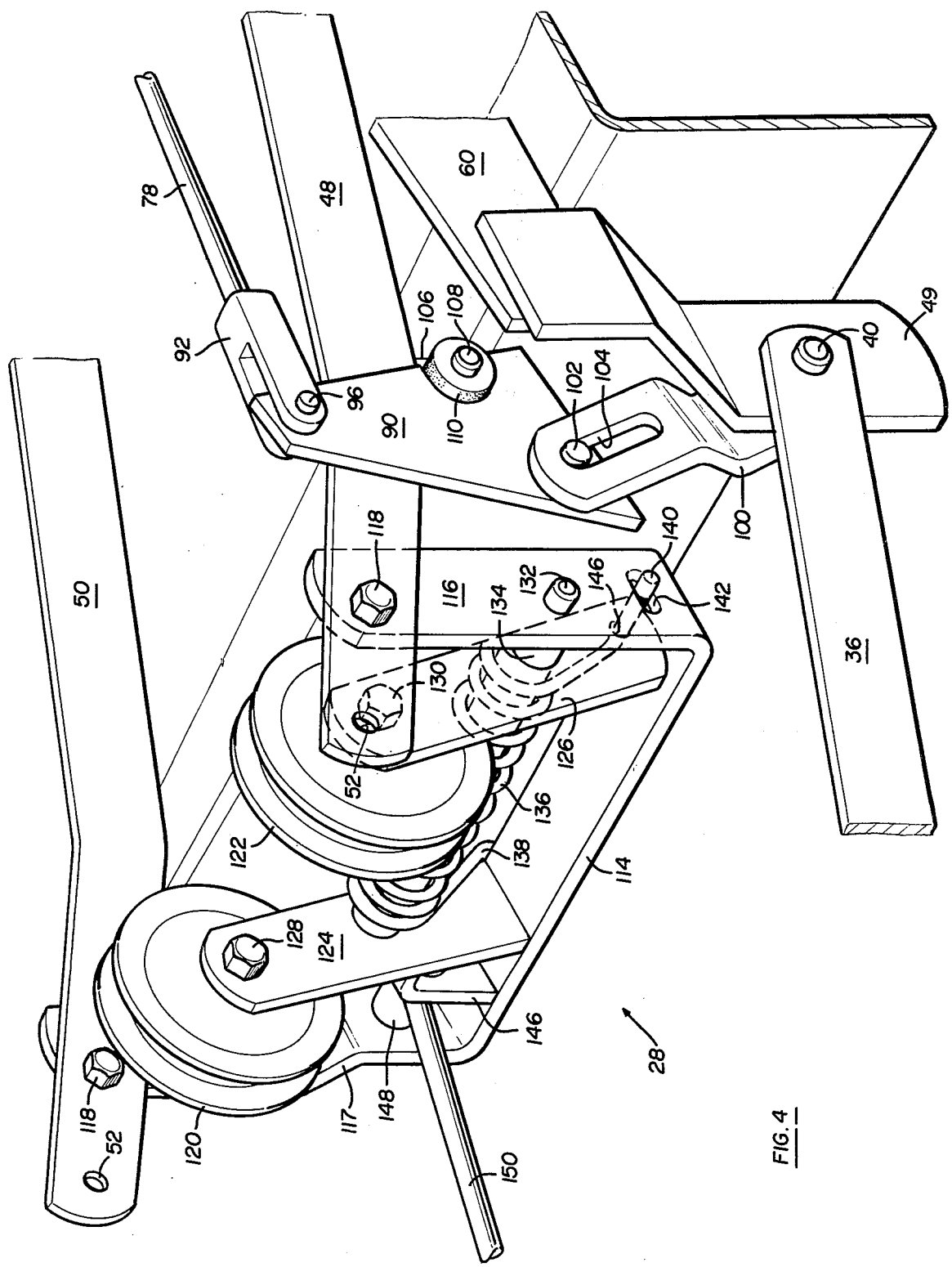
FIG. 4 is an elevated perspective view of one embodiment of the idler sheave assembly and the associated suspension linkage.

The idler sheave assembly 28 is supported on the upper parallel links 48 and 50 by a U-shaped bracket 114, as best shown in FIG. 4. The U-shaped bracket includes a pair of upwardly extending legs 116 and 117, which are pivotally connected to the upper links 48 and 50 by bolts 118 and washers, not shown. The disclosed embodiment of the idler sheave assembly includes a fixed mule sheave 120 and a spring biased rock sheave 122. The mule sheave is rotatably supported on a support arm 124 by a bolt and washer assembly 128. The support arm 124 is welded or otherwise secured to the bite or midportion of the U-shaped bracket 114. The rock sheave 122 is rotatably supported on a spring loaded arm 126 by a bolt and washer assembly 130.

The spring loaded arm 126 is rotatably supported on a shaft 132 and bearing sleeve 134. The shaft is received through apertures in support arm 124 and the upwardy extending leg 116 of the bracket. The sleeve 134 is rotatably journaled on the shaft 132. The rock sheave support arm 126 is connected to the sleeve to rotate therewith. A torsion spring 136 is received on the sleeve to spring bias the rock sheave against the tension of the drive belt 26. One end 138 of the torsion spring is hook-shaped and received around the midportion of the bracket 114. The free end 140 of the torsion spring is received through a slot 146 in the rock sheave support arm 126 and extends through an elongated slot 142 in leg 116 of the bracket.

The disclosed idler sheave assembly 28 is the subject of a separate application for United States Patent, Ser. No. 217,718, filed concurrently herewith, which is incorporated herein by reference. The application describes the idler sheave assembly and its operation in more detail. Briefly, the idler sheave assembly operates, as follows. The torsion spring 136 spring biases the rock sheave 122 against the tension of the drive belt. The free end 140 of the torsion spring serves as an indicator of belt tension. The belt tension is adjusted by an adjustment screw 150 which is threadably received in a barrel nut 148. The barrel nut is rotatably retained in opposed aligned apertures in leg 117 of the U-shaped bracket and an L-shaped support bracket 146. The bracket 146 is welded or otherwise secured to the midportion of the bracket 114 and mule sheave support arm 124. The adjustment screw includes a handle portion 152 which extends beyond the carriage hitch 22 as shown in FIG. 1 and a roll pin assembly 154 which prevents longitudinal movement of the adjustment screw, while permitting rotational movement. The roll pin assembly includes washers on opposed sides of the carriage hitch, which are retained against movement along the adjustment screw by cotter pins.

Rotational movement of the adjustment screw 150 threads the screw in barrel nut 148 to adjust the angular position of the U-shaped bracket 114 about the pivotal connections 118 of the bracket support legs 116 and 117. The pivotal angular movement of the U-shaped bracket toward the carriage hitch 22 reduces the tension in the belt, as the mule sheaves 120 and 122 are biased against the tension in the belt. Rearward movement of the bracket increases the tension in the drive belt 26. Thus, the belt tension may be easily adjusted by rotation of adjustment screw 150. The idler sheave assembly is initially adjusted such that correct adjustment is indicated by the free end 140 of the torsion spring in elongated slot 142. When the free end of the spring is located in the center of the slot, the belt tension is correct for normal operating conditions.

Figure 2:
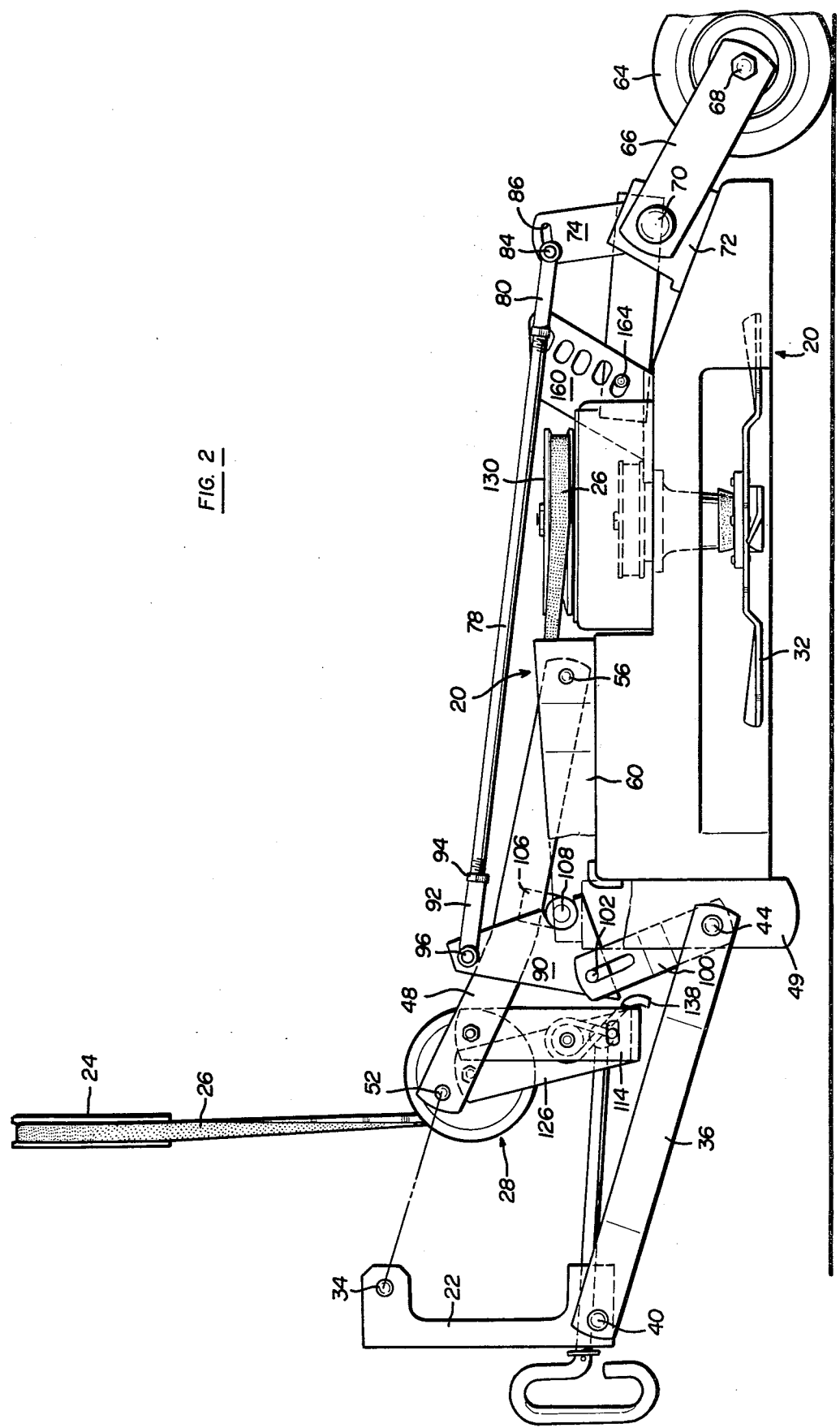
FIG. 2 is a side elevation of the lawn mower suspension shown in FIG. 1, with the mower lowered.

The unique suspension of the idler sheave assembly 28 on the U-shaped bracket 114 on the upper parallel links 48 and 50 maintains the tension in the drive belt as the mower assembly 20 is raised or lowered, as now described. When the wheel support arms 66 are rotated about rock shaft 70, the gage wheels 64 are swung beneath the rearward end of the mower to raise or lower the rearward end of the mower as shown in FIGS. 1 and 2. The mower assembly 20 is shown in its lowest position in FIG. 2. Rotation of the gage wheels 64 beneath the mower raises the mower as shown in FIG. 1, wherein the mower is located in the highest position, except for the upper transport position. This clockwise rotation of the wheel support arms 66 (from FIG. 2 to FIG. 1) results in a clockwise rotation of lift arm 74 and tensioning of tie rod 78. Tensioning of the tie rod results in a clockwise rotation of bellcrank lever 90 and a simultaneous upward movement of the forward end of the mower about the pivotal connections of the drawbar linkage to the tractor chassis and carriage hitch. The forward and rearward ends of the mower are thus raised in parallel relation, maintaining the rotary blades 32 in parallel relation for an even cut. Counter-clockwise rotation of wheel support arm 66 (from FIG. 1 to FIG. 2) moves tie rod 78 to the left in FIG. 1, rotating bellcrank lever 90 in a counter-clockwise direction and lowering the mower in parallel relation.

The mower is retained at predetermined heights by height adjustment arm 158, which is secured to rock shaft 70. The free end of the height adjustment arm 158 is U-shaped, as shown in FIG. 3, and includes a spring biased lock pin 164. The lock pin includes an unthreaded stud having an enlarged head portion received against the U-shaped end 159 of the height adjustment arm and a torsion spring around the stud and biasing the stud through the apertures in the arm. The mower includes a sector plate 160 having a series of generally vertically spaced slots 162 which receive the spring loaded stud 164. The stud will thus retain the mower at one of the preselected heights when received in one of the slots 162. In the disclosed embodiment, the mower has five height adjustments, including an upper transport position wherein the blades are spaced approximately five inches above the ground. The mower will cut at any height, including the upper transport position.

The lawn mower suspension of this invention thus raises or lowers the mower assembly in parallel relation to maintain the level of the rotary blades while maintaining constant tension in the drive belt 26 although the center distance between the tractor power take-off pulley 24 and the mower driven pulley 30 changes. The suspension of the idler sheave assembly 28 on the upper parallel links 48 and 50 raises or lowers the bracket 114 and the idler sheave assembly with the mower. Because the pivots 118 of the idler sheave bracket 114 raises or lowers the idler sheaves proportionately less than the pivots 56 and 58 of the upper parallel links, the movement of the idler sheave assembly does not make up the complete difference in the belt tension resulting from raising or lowering of the mower. The idler sheaves must therefore self-relocate to make up the difference, yet maintain their constant alignment with each other to assure proper belt tension. This is accomplished by rotation of the U-shaped bracket about the pivots 118, as the mower is raised or lowered. The adjustment screw 150 maintains a constant distance between the roll pin assembly 154 and the barrel nut 148, as described above.

It will be understood by those skilled in the art that various modifications may be made to the mower assembly and tractor which do not form a part of the invention disclosed and claimed herein. Further, the idler sheave assembly and rotary blade control are disclosed and claimed in separate applications, which are incorporated herein by reference. Having fully described the lawn mower suspension of this invention in detail, it will be understood that various modifications may be made to the structure within the perview of the appended claims.

I claim:

1. A suspension for a lawn mower assembly beneath a tractor, said mower assembly having an endless flexible drive belt received about pulleys on the tractor and lawn mower, and a belt tensioning means including a pair of idler sheaves which receive the drive belt and maintain tension in said belt, said mower assembly suspension comprising, in combination: a pair of spaced parallel lower links pivotally attached at their forward ends to said tractor adjacent the forward end of said tractor, said lower links pivotally attached at their rearward ends to said mower assembly adjacent the forward end of said mower assembly, a pair of parallel spaced upper links pivotally attached at their forward ends to said tractor on pivots spaced above and rearwardly of the pivotal connections of said lower links, said upper links pivotally connected at their rearward ends to a midportion of said mower, said upper and lower links being generally parallel, said idler sheaves supported on a bracket means on said upper links rearwardly of said pivotal connections of said upper links to said tractor, wheels rotatably connected to wheel support arms, said support arms pivotally connected to said mower adjacent the rearward end of said mower and supporting the rear end of said mower assembly, and lift linkage means operably interconnecting said wheel support arms and said upper and lower links, said lift linkage means adapted to simultaneously raise or lower the rearward ends of said upper and lower links in parallel relation upon rotation of said wheel arms to raise said mower rear end, thereby raising and lowering said mower ends in parallel relation while maintaining the tension in said drive belt.

2. The mower suspension defined in claim 1, characterized in that said bracket means comprises a U-shaped yoke, said yoke having a midportion supporting said idler sheaves and upwardly extending legs pivotally supported on said upper links spaced rearwardly from the pivotal connection of said upper links to said tractor, whereby said idler sheaves move vertically with said mower to maintain the tension in said flexible drive belt.

3. The mower suspension defined in claim 1, characterized in that said lift linkage means includes a bellcrank lever pivotally connected at spaced pivots to one of said upper and lower links and a tensioning means, said tensioning means pivotally connected to said bellcrank lever and operably connected to said wheel arms, said tensioning means adapted to rotate said bellcrank lever to raise or lower the rear ends of said links to raise the forward end of said mower upon rotation of said wheel arms raising and lowering the rearward end of said mower, thereby raising or lowering said mower ends in parallel relation.

4. The mower suspension defined in claim 3, characterized in that said wheel support arms are connected to a rotatable rock shaft adjacent the rear of said mower, an upwardly extending lift arm connected to said rock shaft and said tensioning means including a tie rod pivotally connected at opposed ends to the free end of said lift arm and said bellcrank lever, whereby rotation of said wheel support arms to raise or lower the rear end of said mower rotates said lift arm and tensions said tie rod to simultaneously raise or lower the forward end of said mower in parallel relation.

5. The mower support defined in claim 4, characterized in that an adjustment arm is connected to said rock shaft at one end, said mower assembly having a sector plate including a plurality of generally vertically spaced holes, and the free end of said adjustment arm having a spring biased retainer receiveable in one of said sector plate holes to retain said mower at the desired height.

6. The mower suspension defined in claim 3, characterized in that said bellcrank lever is pivotally connected to said lower link by a leveler link, said leveler link pivotally connected at one end to the pivotal connection of said lower link to said mower assembly and said leveler link pivotally connected at its opposed end to said bellcrank by a lost motion connection including a slot in said leveler link and a pin on said bellcrank lever.

7. A suspension for a power lawn mower assembly on a tractor, said mower assembly having an endless flexible drive belt and a belt tensioning means including a pair of idler sheaves which receive the belt, said tensioning means adapted to maintain tension in the drive belt during operation of the mower, said mower suspension comprising, in combination, a pair of spaced parallel lower links pivotally connected at opposed ends to said mower assembly and said tractor adjacent the forward end of said tractor, a pair of parallel spaced upper links pivotally attached at opposed ends to said mower and said tractor on pivots spaced above and rearwardly of the pivotal connections of said lower links, said upper and lower links being generally parallel, said idler sheaves supported on a U-shaped bracket having upwardly extending legs pivotally supported on said upper links, the pivotal connection spaced rearwardly of the pivotal connections of said upper links to said tractor, a rotatable rock shaft extending generally perpendicular to said links at the rearward end of said mower assembly, wheel support arms connected to said rock shaft rotatably supporting rear mower wheels, a lift arm connected to said rock shaft extending generally upwardly and a lift linkage means interconnecting said lift arm and said upper and lower links, said lift linkage means adapted to simultaneously raise or lower the rearward ends of said upper and lower links and the forward end of said mower upon rotation of said wheel support arms and said lift arm about said rock shaft raising or lowering the rear end of said mower, thereby raising or lowering said mower forward and rearwards in parallel relation, said idler sheaves and bracket moving vertically with said upper links to maintain a constant tension in said flexible drive belt.

8. The mower suspension defined in claim 7, characterized in that said lift linkage means includes a bellcrank lever pivotally connected at spaced pivots to one of said pair of upper and lower links and a tensioning rod, said tensioning rod pivotally connected to the upper end of said bellcrank lever and to said lift arm, whereby rotation of said wheel support arms about said rock shaft rotates said wheels to raise the rearward end of said mower assembly and said lift arm tensions said tensioning rods to rotate said bellcrank lever to raise the rearward ends of said upper and lower links simulaneously raising the forward end of said mower assembly in parallel relation.

9. The mower suspension defined in claim 7, characterized in that said bellcrank lever is pivotally connected to said lower link by a leveler link, said leveler link pivotally connected at one end to the pivotal connection of said lower link and said mower assembly, the opposed end of said lower link pivotally connected to said bellcrank.

10. The mower suspension defined in claim 7, characterized in that said mower assembly includes an adjustment retainer means adapted to retain said mower at a preselected height, said adjustment retainer means comprising an adjustment arm connected to said rock shaft having a free end, said mower assembly having a sector plate including a plurality of generally vertically spaced apertures, said adjustment arm free end having a spring biased detent receivable in one of said sector plate apertures to retain said mower assembly at said preselected height.

* * * * *